United States Patent [19]

Sato et al.

[11] Patent Number: 5,380,975
[45] Date of Patent: Jan. 10, 1995

[54] ELECTRIC DISCHARGE MACHINING APPARATUS

[75] Inventors: Tatsushi Sato; Yoshihito Imai, both of Hyogo, Japan

[73] Assignee: Mitsubishi Denki Kabushiki Kaisha, Tokyo, Japan

[21] Appl. No.: 991,643

[22] Filed: Dec. 15, 1992

[30] Foreign Application Priority Data

Dec. 24, 1991 [JP] Japan ................................ 3-339217

[51] Int. Cl.6 .............................................. B23H 1/02
[52] U.S. Cl. ................................ 219/69.18; 219/69.13
[58] Field of Search ........................... 219/69.13, 69.18

[56] References Cited

U.S. PATENT DOCUMENTS

| | | | |
|---|---|---|---|
| 2,895,080 | 7/1959 | Branker | 219/69.18 |
| 3,246,113 | 4/1966 | Scarpelli | 219/69.13 |
| 4,347,424 | 8/1982 | Obara | 219/69.13 |
| 4,347,425 | 8/1982 | Obara | 219/69.13 |
| 4,361,745 | 11/1982 | Rupert et al. | 219/69.13 |
| 4,659,894 | 4/1987 | Inoue | 219/69.18 |
| 4,894,504 | 1/1990 | Truty | 219/69.13 |
| 5,083,001 | 1/1992 | Kinbara et al. | 219/69.18 |

FOREIGN PATENT DOCUMENTS

| | | | |
|---|---|---|---|
| 46-8080 | 3/1971 | Japan | 219/69.13 |
| 56-21728 | 2/1981 | Japan | 219/69.13 |
| 59-59319 | 4/1984 | Japan | 219/69.18 |

*Primary Examiner*—Geoffrey S. Evans
*Attorney, Agent, or Firm*—Sughrue, Mion, Zinn, Macpeak & Seas

[57] ABSTRACT

An electric discharge machining apparatus of the type in which an electric power for electric discharge is accumulated in capacitors to perform electric discharge machining. To provide an electric discharge machining apparatus in which the manufacturing cost is relatively low, the machining speed is high, the machined surface is not damaged, and the electrode wear is low, a plurality of capacitors are connected in parallel with a machining gap which is formed by a machining electrode and workpiece that face each other. Charging resistors are provided in a charging circuit which is connected between a charging device for charging the capacitors and the capacitors. Switches are connected in series in a discharging circuit which is connected between the capacitors and the machining gap. A control device for controlling the on/off operation of the switches sequentially is provided to performing the electric discharge machining with high speed and high accuracy.

11 Claims, 3 Drawing Sheets

ELECTRIC DISCHARGE MACHINING APPARATUS

BACKGROUND OF THE INVENTION

1. Field of the Invention

The present invention relates to an electric discharge machining apparatus, and more particularly to an electric discharge machining apparatus of the type in which an electric power for electric discharge is accumulated in capacitors to perform electric discharge machining.

2. Description of the Related Art

FIG. 1 is a circuit diagram showing the construction of an example of a conventional electric discharge machining apparatus of the charge storage type. In the figure, reference numeral 1 denotes a charging unit for charging a capacitor 3 through a charging resistor 2 for limiting a charging current. Reference numerals 5 and 6 designate a machining electrode and a workpiece to be machined, respectively.

An operation of the apparatus will be described. In an initial state, the capacitor 3 has no electric charges, and a machining gap is formed between the machining electrode 5 and the workpiece 6 which face each other in a free state. First, a current flows from the charging unit 1 into the capacitor 3 through the charging resistor 2, so that the capacitor 3 is charged. As the charging of the capacitor 3 advances, a voltage appearing across the capacitor 3 rises, and a voltage is applied to the machining gap. Then, discharge will be induced with a certain probability. When discharge occurs, the electric energy stored in the capacitor 3 is supplied to the machining gap through the discharging circuit thereby performing electric discharge machining.

The conventional electrical discharge machining apparatus of this type, which operates as described above has problems described below.

At first, since the probability of discharge occurrence depends on the level of a voltage applied to the machining gap, the machining energy level varies for every discharge, as a result of which the size of a discharge trace formed on the machined surface is also varied. Generally, in electric discharge machining, the surface roughness is determined by the size of the largest discharge trace. On the other hand, as the size of a discharge trace is made smaller, the efficiency of a machining is deteriorated in a greater degree. Therefore, in the above-mentioned circumstances where the size of a discharge trace varies, machining is conducted with forming machining traces that are much smaller than a criterion which is set in view of the required surface roughness. Consequently, this results in that the machining speed is lowered.

The charging rate of the capacitor 3 is determined by the time constant which is determined by the resistance of the charging resistor 2 and take capacitance of the capacitor 3. Generally, in order to increase the machining speed, the frequency of discharge is required to be increased, and the capacitor 3 is required to be rapidly charged. If the resistance of the charging resistor 2 is low and the charge time constant is set to be small in order to increase the charging speed, however, a large amount of current flows from the charging unit 1 into the capacitor 3 before the termination of discharge. This causes a current to directly flow from the charging unit 1 into the machining gap, so that sustaining arc discharge is induced, whereby the machined surface is damaged. Therefore, the resistance of the charging resistor 2 cannot be so low, thereby causing a problem that the machining speed cannot be improved.

Moreover, since the discharging circuit constituted by the capacitor 3 and the machining gap has a very low impedance, electric charges once stored in the capacitor 3 are discharged for a very short period, so that the waveform of a discharging current is changed abruptly. Generally, the steeper a discharging current (especially its rising portion) waveform is, the larger the electrode wear becomes. Accordingly, in order to reduce the electrode wear, it is necessary to make the discharging current waveform gentle. For this purpose, a counter measure may be incorporated in which the discharge time constant is set larger by, for example, connecting an inductance element in the discharging circuit. In order to avoid the sustaining arc discharge, however, it is necessary that the charge time constant is set to be sufficiently larger than the discharge time constant. Consequently, when the discharge time constant is set large, the frequency of discharge is lowered. Therefore, there exists a problem in that it is difficult to reduce the electrode wear while maintaining the machining speed at a practical level.

As a solution of the problems accompanying such a conventional electric discharge machining apparatus of the charge storage type, it has been proposed to provide a plurality of charge and discharge circuits each of which has a charge switch and a discharge switch, as disclosed in, for example, Published Unexamined Japanese Patent Application No. sho-50-101997. Hereinafter, for convenience of discussion, such a machining apparatus is referred to as an electric discharge machining apparatus of the capacitor-switching type.

FIG. 2 is a circuit diagram showing the construction of a conventional electric discharge machining apparatus of the capacitor-switching type. In FIG. 2, the circuit components same as or corresponding to those of the conventional electric discharge machining apparatus shown in FIG. 1 bear the same reference numerals, and the description thereof is omitted.

In FIG. 2, reference numerals 1-1 and 1-2 denote a first charging unit and a second charging unit, respectively; 2-1, a first charging resistor; 2-2, a second charging resistor; 3-1, a first capacitor; 3-2, a second capacitor; 4-1, a first discharge switch; 4-2, a second discharge switch; 13, a charge switch control signal generating circuit; 14-1, a first Zener diode; 14-2, a second Zener diode; 15-1, a first charge switch; and 15-2, a second charge switch.

An operation of the conventional apparatus of FIG. 2 will be described.

In an initial state (immediately after the previous discharge), the second capacitor 3-2 stores no electric charges because of the previous discharge. In this case, the second charge switch 15-2 is maintained in an off-state whereas the first charge switch 15-1 is maintained in an on-state, so that the first capacitor 3-1 is charged by the first charging device 1-1. The amount of electric charges stored in the first capacitor 3-1 depends on the period which has elapsed after the first charge switch 15-1 has been turned on. With the increase of the charging level of the first capacitor 3-1, a voltage appearing across the terminals thereof rises. When this voltage exceeds a Zener voltage of the first Zener diode 14-1, the first Zener diode 14-1 is made conductive and the first discharge switch 4-1 is then operated to connect the first capacitor 3-1 to the machining gap. At the same time, the charge switch control signal generating circuit 13 controls the second charge switch 15-2 to be turned on.

After a while, discharge is induced in the machining gap, the electric charges in the first capacitor 3-1 are consumed, and the first Zener diode 14-1 is made nonconductive. At the same time, the charge switch control signal circuit 13 controls the first charge switch 15-1 to be turned off. During this period the second charge switch 15-2 remains on, and therefore the second capacitor 3-2 is charged by the second charging unit 1-2. The amount of the electric charges stored in the second capacitor 3-2 depends on the period which has elapsed after the second charge switch 15-2 was turned on. With the increase of the charging level of the second capacitor 3-2, a voltage appearing across the terminals thereof rises. When this voltage exceeds the Zener voltage, the second Zener diode 14-2 is made conductive and the second discharge switch 4-2 is operated to connect the second capacitor 3-2 to the machining gap. At the same time, the charge switch control signal generating circuit 13 controls the first charge switch 15-1 to be turned on. After a while, second discharge is induced in the machining gap, and the electric charges in the second capacitor 3-2 are consumed, and the second Zener diode 14-2 is made nonconductive. At the same time, the charge switch control signal circuit 13 controls the second charge switch 15-2 to be turned off. The state of the apparatus is returned to the initial state. By repeating the above-mentioned operation, therefore, electrical discharge machining can be repeated.

In the conventional electric discharge machining apparatus of the capacitor-switching typed which operates in the above-mentioned manner, while one capacitor is charged, electric discharge machining is performed by the other capacitor. Therefore, it can be expected that the machining speed is improved to some degree. However, since discharge is induced with a certain probability, an unfavorable case may occur wherein the voltage appearing across the terminals of one capacitor exceeds the Zener voltage before the electric charges in the other capacitor are not yet completely discharged. If discharge is induced at this time, discharge of the electric charges in the other capacitor is followed by that of the electric charges in the one capacitor. As a result, an unexpected large discharge trace is formed on the surface of the workpiece, whereby the machined surface is damaged. Moreover, the electrode wear is large in a similar manner as the conventional electric discharge machining apparatus of the charge storage type.

When the charge switches operate slowly, a charging current from the DC power supplies flows directly into the machining gap during discharge. This causes the machined surface to be damaged. Therefore, it is necessary to use a charge switch which operates at a high speed, thereby causing a problem that the apparatus becomes expensive.

As described above, conventional electric discharge machining apparatus have the problems that the machining speed cannot be improved and that the electrode wear is large. Moreover, there is the problem that an unexpected large discharge trace is formed on the surface of a workpiece, so that the machined surface is damaged. Furthermore, there is the problem that the use of a charge switch which operates at a high speed causes the apparatus to become expensive.

SUMMARY OF THE INVENTION

In view of the above, the present invention is accomplished to eliminate the above-mentioned problems and difficulties accompanying the conventional apparatuses. Accordingly, an object of the present invention is to provide an electric discharge machining apparatus in which discharge is generated with an electrical energy of a constantly fixed level, the frequency of discharge can be increased without causing arc discharge to occur, the discharging current waveform is gentle, a switch which operates slowly can be used, the machining speed is high, the machined surface is not damaged, the electrode wear is small, and the apparatus is inexpensive.

The above, and other objects of the present invention are accomplished by the provision of an electric discharge machining apparatus comprising a plurality of capacitors connected in parallel with a machining gap which is formed by a machining electrode and a workpiece, said machining electrode and said workpiece facing each other, a charging means for charging said capacitors, charging resistors provided in a charging circuit, which is connected between said charging means and said plurality of capacitors, switches each of which is connected in series in a discharging circuit, said discharging circuit being connected between said plurality of capacitors and said machining gap, and a first control means for controlling the on/off operation of said switches sequentially.

According to the present invention, a capacitor which is sufficiently charged is connected to the machining gap so as to generate discharge. As a result, machining is performed and discharge traces of an equal size are formed. Moreover, a plurality of capacitors are switched to be connected to the machining gap, and the frequency of discharge is made large, whereby the machining speed is improved.

According to the invention, the inductance element is connected in the discharging circuit, so that the electrode wear is improved. Sustaining arc discharge due to the connection of the inductance element is prevented from occurring by setting the charge time constant to be sufficiently large so as to slowly charge the capacitors. Moreover, a plurality of capacitors are switched to be connected to the machining gap, so that the apparent charge time constant becomes small, thereby preventing the lowering of the machining speed which may be caused by setting the charge time constant large, from occurring.

According to the invention, at least one inductance element is connected in parallel with an inductance element connected in the discharging circuit, so that inductance elements are appropriately selected in accordance with the capacitance of the used capacitors and the desired machining state, thereby efficiently performing the machining.

According to the invention, a current flowing from one capacitor to another capacitor is blocked by a rectifying element, so that the slow turn OFF operation of the corresponding switch does not cause the frequency of discharge to be lowered, whereby the apparatus is allowed to use an inexpensive and low-speed switch.

BRIEF DESCRIPTION OF THE DRAWINGS

The accompanying drawings, which are incorporated in and constitute a part of the specification, illustrated presently preferred embodiments of the invention and, together with the general description given above and the detailed description of the preferred embodiments given below, serve to explain the principles of the invention. In the accompanying drawings.

DESCRIPTION OF THE PREFERRED EMBODIMENTS

Figure 1:
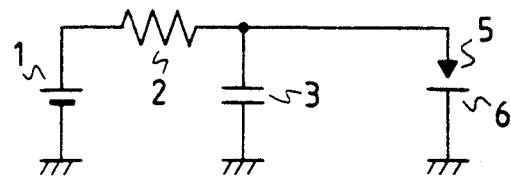
FIG. 1 is a circuit diagram showing the construction of a conventional electric discharge machining apparatus having charge and discharge units.
Figure 2:
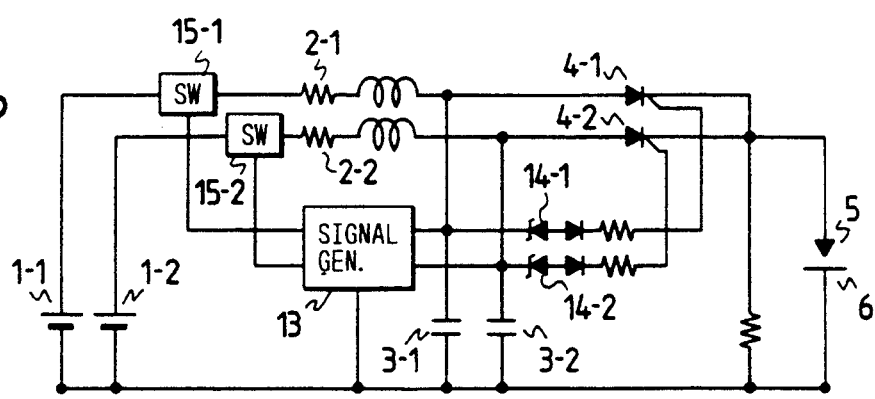
FIG. 2 is also a circuit diagram showing the construction of a conventional electric discharge machining apparatus having charge and discharge units.
Figure 3:
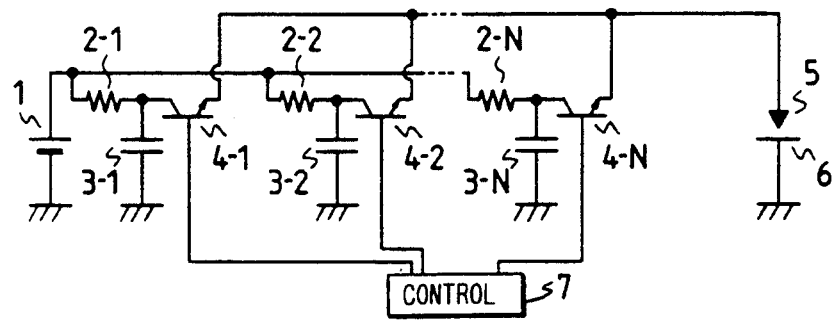
FIG. 3 is a circuit diagram showing the construction of an electric discharge machining apparatus according to a first embodiment of the present invention.

FIG. 3 is a diagram showing the construction of an electric discharge machining apparatus which is an embodiment of the invention. In the figure, the components same as or corresponding to those employed in the conventional electric discharge machining apparatus of the charge storage type shown in FIG. 1 and in the conventional electric discharge machining apparatus of the capacitor switching type of FIG. 2 are designated by the same reference numerals, and the description thereof is omitted.

In FIG. 3, reference numeral 2-1 denotes a first charging resistor; 2-2, a second charging resistor; 2-N, an Nth charging resistor; 3-1, a first capacitor; 3-2, a second capacitor; 3-N, an Nth capacitor; 4-1, a first discharge switch; 4-2, a second discharge switch; 4-N, an Nth discharge switch; and 7, a control device for controlling the discharge switches 4.

Next, an operation of the apparatus shown in FIG. 3 will be described.

It is assumed that the total number of the connected capacitors 3 is N, and the respective capacitors 3 and the switches 4 which are connected in series are numbered one to N. If the I-th switch 4-I is turned ON, the I-th capacitor 3-I is allowed to be connected to the machining gap. In an initial state (immediately after the previous discharge), only the first switch 4-1 is ON, and the first capacitor 3-1 stores no electric charges. The remaining switches 4-2 to 4-N other than the first switch 4-1 are placed in the off state, and the capacitors 3-2 to 3-N connected in series to these switches store electric charges. The amount of the electric charges stored in each of the capacitors depends on the period which has elapsed after the corresponding switch was turned off. The control device 7 controls the first switch 4-1 to be turned on. After a predetermined period has elapsed, the control device 7 controls the first switch 4-1 to be turned off, and then (if necessary, after a certain pause) the second switch 4-2 to be turned on. After a while, discharge is induced and the electric charges in the second capacitor 3-2 are consumed for machining. In the same way, the control device 7 repeats the operation in which the I-th switch 4-I is turned off, and then (if necessary, after a certain pause) the (I+1)th switch 4-I+1 is turned on and kept in the on state for a while. After the N-th switch 4-N is turned off, the first switch 4-1 is turned on. Then, the electric charges in the first capacitor 3-1 are discharged and the state of the apparatus is returned to the initial state.

In the above process, the switching timing of the switches 4 is set in such a manner that a capacitor 3 is connected to the discharge gap after this capacitor 3 has been sufficiently charged. For example, the capacitors 3 are controlled by the control device 7 so that the capacitors 3 are sequentially connected to the machining gap at an interval equal to or greater than three times of the charge time constant. As a result, discharge with an energy of a fixed level can be always induced, thereby allowing the machining to be performed efficiently. Since the charging of each capacitor can be performed under a large time constant without lowering the frequency of discharge, the machined surface is not damaged even in a case where switches which operate relatively slowly are used. Even if discharge is not induced during the on state of a switch in the above-mentioned process, the machined surface is not damaged because a plurality of capacitors are not simultaneously connected to the machining gap, unlike the conventional apparatus.

Figure 4:
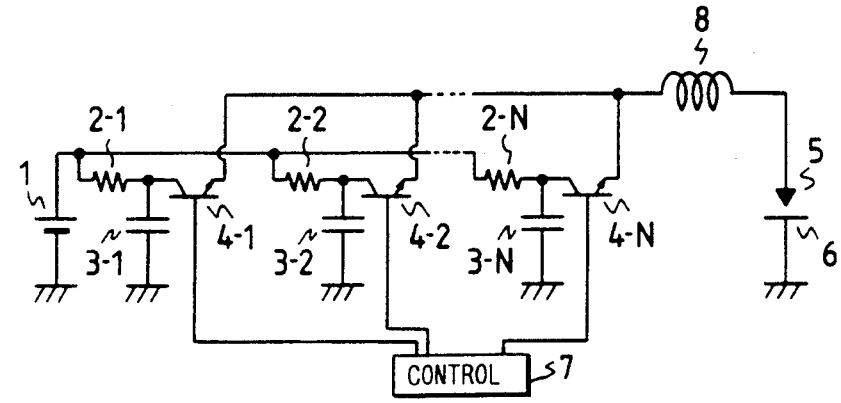
FIG. 4 is a circuit diagram showing the construction of an electric discharge machining apparatus according to a second embodiment of the invention.

FIG. 4 is a diagram showing the construction of an electric discharge machining apparatus which is a second embodiment of the invention. The components same as or corresponding to those in the first embodiment are designated by the same reference numerals, and the description thereof is omitted.

In FIG. 4, reference numeral 8 denotes an inductance element.

An operation of the apparatus will be described. The ON/OFF operation of the switches and the sequence of charging and discharging the capacitors are the same as in the first embodiment. However, the second embodiment is different from the first embodiment in that the inductance element 8 is connected in the discharging circuit so that a discharging current gradually increases. Accordingly, the discharging current waveform becomes gentle so as to avoid occurrence of undesired wear of the electrode. The provision of the inductance element 8 in the discharging circuit increases the discharge time constant. In the conventional electric discharge machining apparatus of the charge storage type, this increased discharge time constant may cause sustaining arc discharge to be induced. In this embodiment, however, since a sufficiently large charge time constant is set by providing a large charge resistance, sustaining arc discharge may not be generated. This large charge time constant lowers the frequency of discharge. In a conventional electric discharge machining apparatus of the charge storage type, this lowered frequency of discharge may cause the machining speed to be decreased. On the contrary, in this embodiment, since the sufficiently large number of capacitors 3 and switches 4 are connected in parallel with the machining gap and the charged capacitors 3 are sequentially connected to the machining gap, the machining speed is not lowered. That is, in this example, the electrode wear can be improved without lowering the machining speed and damaging the machined surface.

Figure 5:
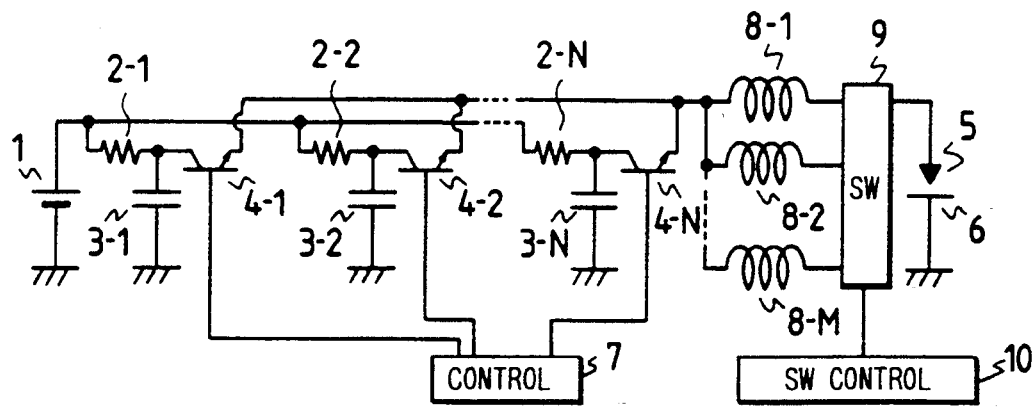
FIG. 5 is a circuit diagram showing the construction of an electric discharge machining apparatus according to a third embodiment of the invention.

FIG. 5 is a circuit diagram showing the construction of an electric discharge machining apparatus which is a third embodiment of the invention. The components other than inductance elements 8-1 to 8-M, a selection switch 9 for selectively connecting one or more inductance elements 8 in parallel, and a switch control unit 10 for controlling the selection switch 9 are substantially same as those in FIG. 4.

Next, the operation of the apparatus of FIG. 5 is also substantially same as that of FIG. 4. In this embodiment, a parallel circuit of a plurality of inductance elements 8-1 to 8-M is arranged in series in the discharging circuit. A parallel circuit including one or more of the inductance elements are connected in series in the discharging circuit by the selection switch 9 under the control of the switch control device 10. Therefore, a suitable inductance element having a certain inductance can be selectively used in accordance with the conditions such as the capacitance of the used capacitors 3 and the desired machining properties, thereby performing the machining more efficiently.

Figure 6:
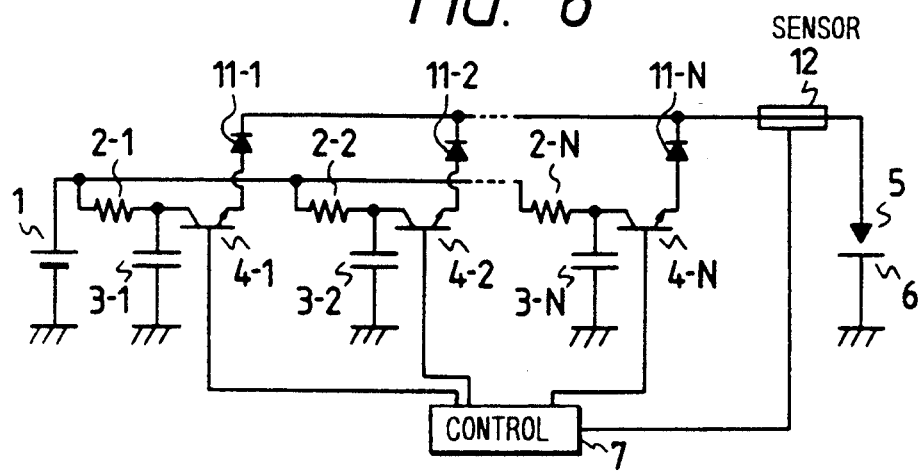
FIG. 6 is a circuit diagram showing the construction of an electric discharge machining apparatus according to a fourth embodiment of the invention.

FIG. 6 is a circuit diagram showing the construction of an electric discharge machining apparatus which is a fourth embodiment of the invention. The components same as or corresponding to those in Embodiment 1 are represented by the same reference numerals, and the description thereof is omitted.

In FIG. 6, reference numeral 11-1 denotes a first rectifier; 11-2, a second rectifier; 11-N, an Nth rectifier; and 12, a discharge sensor.

Next, the operation of the apparatus is described. An operation of the apparatus as shown in FIG. 6 is substantially the same as the first embodiment. In this case, however, the rectifiers 11 are provided in the discharging circuit, so that, even if a plurality of switches 4 are in the on state, a current is not allowed to flow from one capacitor 3 to another capacitor 3. Therefore, when the discharge sensor 12 detracts the occurrence and cessation of discharge, the control device 7 can control a next switch 4 to be turned on, at an arbitrary timing and without waiting the turn off of the previous switch 4. In some cases, after an instruction to be turned on the next switch 4 is issued (for example, during no-load period of the following discharge), an instruction to be turned off the previous switch 4 may be issued. Accordingly, the frequency of discharge can be further improved. According to the above-mentioned construction, even if switching elements which operate slowly are used as the switches 4, the machining speed is not lowered, with the result that the apparatus becomes inexpensive. When such low-speed switch elements are used, unlike the conventional apparatus, the control device 7 controls the next switch 4 to be turned ON after detecting the occurrence and cessation of discharge. This prevents the next capacitor 3 from being connected to the machining gap while another capacitor 3 which has not yet sufficiently discharged the electric charges is connected to the machining gap, thereby ensuring that the machined surface is not damaged.

Figure 8:
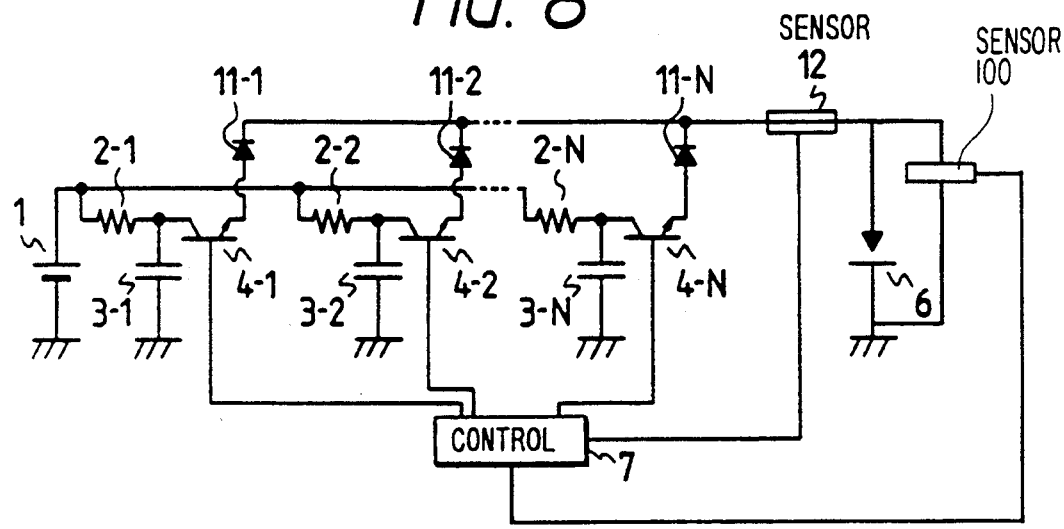
FIG. 8 is a circuit diagram showing the construction of an electric discharge machining apparatus according to a modified version of the fourth embodiment of the invention shown in FIG. 6.
Figure 9:
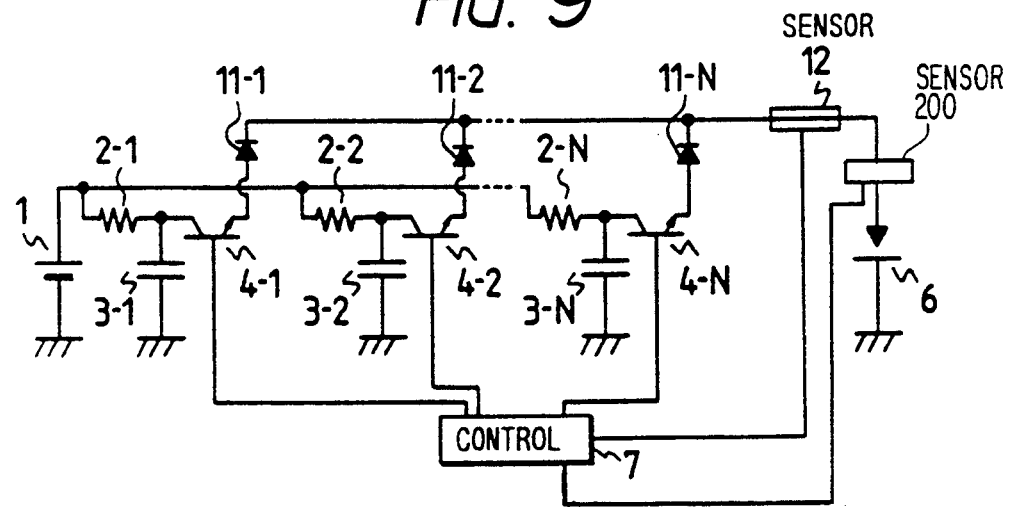
FIG. 9 is a circuit diagram showing the construction of an electric discharge machining apparatus according to a modified version of the fourth embodiment of the invention illustrated in FIG. 6.

In the foregoing embodiments, the control device 7 controls the on/off operation of the switches 4 on the basis of the elapsed period of time. Alternatively, discharge detector for detecting the occurrence of discharge may be provided in the discharging circuit. The switching operation is carried out in accordance with the output of the detector. According to this configuration, it is possible to surely induce discharge for every charge. Moreover, immediately after the discharge is terminated, the control device 7 can start its next operation, so that the machining speed can be improved. The detection means may be realized by various techniques such as that the voltage at the machining gap is measured and the existence of discharge is judged on the basis of this measured voltage, as illustrated in FIG. 8 using voltage sensor 100 and that the occurrence of discharge is detected on the basis of a discharging current flowing through the discharging circuit as illustrated in FIG. 9 using current sensor 200.

The above-mentioned embodiments may be modified so that discharge state measuring unit for measuring the discharge state is provided in the discharging circuit and, in accordance with the output indicative of the discharge state, the switches are switched from the off state to the on state. According to this configuration, a pause of an appropriate length can be ensured depending on the state of the interelectrode. In the measuring means, a no-load period, an average voltage value or the like may be used. In a usual electric discharge machining apparatus, detector for detecting the occurrence of discharge, such as a discharge current detector or an interelectrode voltage detector is provided in order to realize an electrode servo system for feeding a machining electrode toward a workpiece. By utilizing the output of such detection means, the control of the switches can be finely conducted in the same manner as described above, even when the above-mentioned discharge detection means or discharge state measuring means is not separately provided.

In the above-described embodiments, the capacitors are sequentially connected to the machining gap in a predetermined order. In this example, charge state measuring unit for detecting the charge state of each capacitor 3 is provided. On the basis of the output of the charge state measuring unit, one of the capacitors 3 which has been sufficiently charged is selected by appropriate means, and connected to the machining gap. According to this configuration, the machining can be more precisely performed with an energy of a fixed level. The charge state detection means may be realized by various techniques such as that the voltage appearing across the terminals of each of the capacitors 3 is measured, and that a current flowing through the charging circuit is detected by a Hall element or the like and the output of the Hall element is integrated. When such a configuration is adapted, for example, capacitors of several kinds of capacitance may be used as the capacitors 3, and the kind of the capacitance to be connected to the machining gap may be changed as required. Alternatively, two or more of the capacitor 3 may be simultaneously connected to the machining gap, so as to substantially increase the capacitance. If charge switches are respectively connected in series with the capacitors 3 in the charging circuits and the switches are controlled so as to adjust the amount of stored electric charges, the discharge energy can be precisely kept at a fixed level. Hence, the amount of stored electric charges can be adjusted irrespective of the capacitance of the capacitors.

Figure 7:
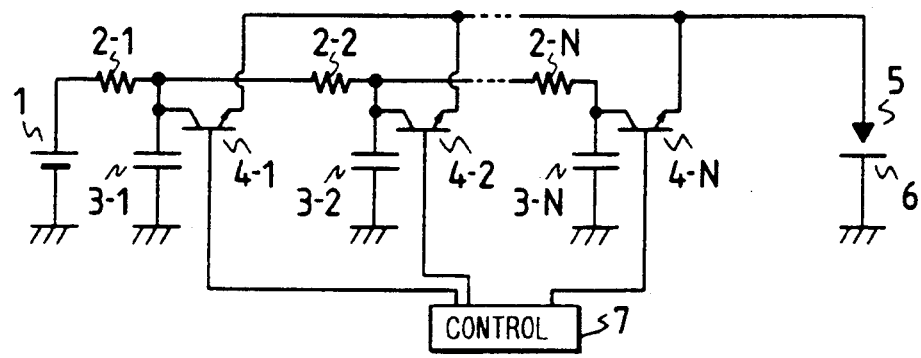
FIG. 7 is a circuit diagram showing the construction of an electric discharge machining apparatus according to an fifth embodiment of the invention.

In the above-described embodiments, the charging resistors 2 are connected in series with the corresponding capacitors 3. Alternatively, the resistors may be connected in series in the charging circuit, as shown in FIG. 7. In this embodiment, it is possible to separately install a resistor for limiting a current from a machining power supply 1 and for limiting a current from the corresponding capacitor 3. Accordingly, it is advantageously unnecessary to provide a large number of resistors with high resistance in a precise manner.

What is claimed is:

1. An electric discharge machining apparatus providing power across a machining gap which is formed by a machining electrode and a workpiece, said machining electrode and said workpiece facing each other, said apparatus comprising:
   a plurality of capacitors connected in parallel with said machining gap;
   a charging means for charging said capacitors;
   a plurality of charging resistors, each of said charging resistors being directly connected between said charging means and a respective one of said capacitors;
   a plurality of switches each of which is connected in series between a respective one of said capacitors and said machining gap; and
   a first control means for generating control signals to positively and directly control the on/off operation of said switches sequentially.

2. The electric discharge machining apparatus as defined in claim 1, wherein said control means controls ON/OFF operation of said switches so as to permit one of said switches to be an On state during a predetermined period of time.

3. The electric discharge machining apparatus as defined in claim 1, further comprising an inductance means connected between at least one of said switches and said machining gap.

4. The electric discharge machining apparatus as defined in claim 3, wherein said inductance means comprises a coil.

5. The electric discharge machining apparatus as defined in claim 3, wherein said inductance means comprises a parallel circuit of inductance elements, and a switching element for selectively connecting at least one of said inductance elements to said discharge circuit in response to an output of a second control means.

6. The electric discharge machining apparatus as defined in claim 1, further comprising rectifying means between said switches and said machining gap.

7. The electric discharge machining apparatus as defined in claim 6, wherein said first control means controls the ON/OFF operation of said switches sequentially, in response to an indication of discharge state for each discharge generated in said machining gap.

8. The electric discharge machining apparatus as defined in claim 7, wherein said indication corresponds to completion of each discharge generated in said machining gap.

9. The electric discharge machining apparatus as defined in claim 7, wherein the state of discharge is detected by detecting variation in a voltage appearing across said machining gap.

10. The electric discharge machining apparatus as defined in claim 7, wherein the state of discharge is detected by detecting variation in a discharge current flowing through said discharge circuit.

11. An electric discharge machining apparatus comprising:
    a plurality of capacitors connected in parallel with a machining gap which is formed by a machining electrode and a workpiece, said machining electrode and said workpiece facing each other;
    a charging means for charging said capacitors;
    charging resistors provided in a charging circuit, which is connected between said charging means and said plurality of capacitors;
    a plurality of switches forming a discharging circuit, said discharging circuit being connected between each of said plurality of capacitors and said machining gap by a respective one of said switches;
    a first control means for controlling the on/off operation of said switches sequentially; and
    inductance means connected in series with said discharging circuit,
    wherein said inductance means comprises a parallel circuit of inductance elements, and a switching element for selectively connecting at least one of said inductance elements to said discharge circuit in response to an output of a second control means, and
    wherein respective ones of said resistors, said switches and said capacitors share a common one of a plurality of nodes.

* * * * *